3,153,297
FISH NETTING
Murray G. Grabowsky, Menominee, Mich., assignor to
The Fish Net and Twine Company, Menominee, Mich.,
a corporation of Illinois
Filed July 3, 1962, Ser. No. 207,330
4 Claims. (Cl. 43—7)

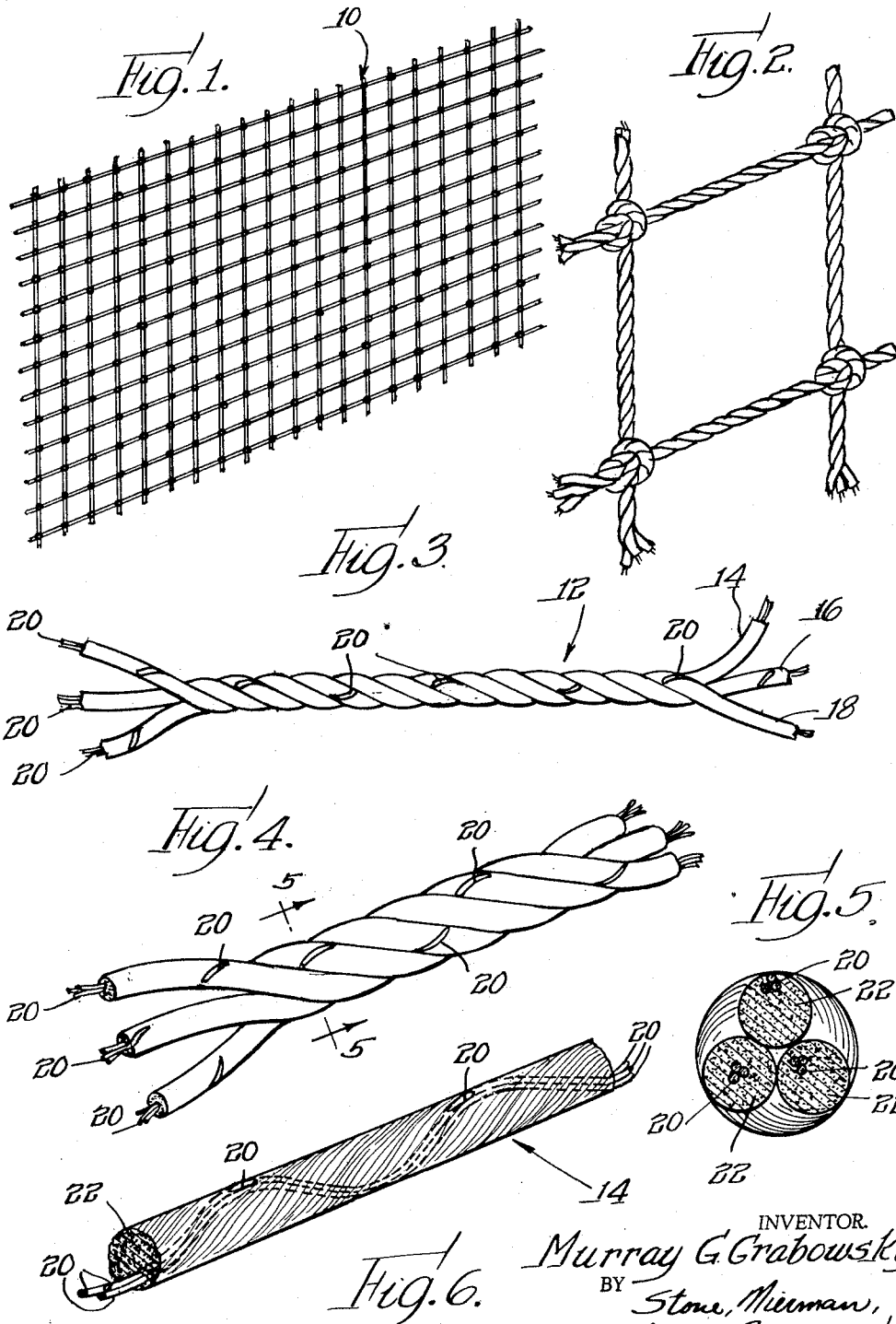

This invention relates to an improved fish netting and more particularly to a fish netting which is not only strong and durable but also repels sharks.

In the ordinary practice of taking fish from an ocean, commercial fishermen generally use fish nets made of cotton or any one of a selected type of nylon. The size of the nets used requires that the nets must be strong and the nets must also be resistant to rot. Furthermore, the construction of the net must be simple so that the nets are easy to handle and all extraneous parts must be avoided.

In certain waters, commercial fishermen encounter sharks which sharks often do severe damage to the nets. A shark caught in a net often tears a net which renders the net unusuable and a net with a large hole results in the loss of a catch, thus, the fisherman is doubly damaged. It is apparent that fishermen wish to keep sharks away from their nets without discouraging other fish and without increasing the complexity of their nets. It is, therefore, the principal object of the hereindisclosed invention to provide a fish net which is strong and durable and also repels sharks from the net when the net is used in sea water.

It is another object of the present invention to provide an improved cable or cord which may be woven on ordinary netting machines but which produces a netting which is a shark repellant when used in sea water.

It is a further object of the instant invention to provide a material which reacts with sea water to produce a shark repellant.

It is a still further object of this invention to provide an improved cable or cord for use in the manufacture of netting.

Other objects and uses of the hereindisclosed invention will become readily apparent to this skilled in the art upon a perusal of the following specification in light of the accompanying drawing in which:

FIGURE 1 is a perspective view of fish netting embodying the hereindisclosed invention;

FIGURE 2 is an enlarged perspective view of a portion of the netting shown in FIGURE 1;

FIGURE 3 is an enlarged view of a portion of a cord which makes up the netting shown in FIGURE 1 with opposite ends of the cord untwisted in order to show better the construction of the cord;

FIGURE 4 is an enlarged end view of a portion of the cord shown in FIGURE 3 with a portion of filaments of each of the plies of the cord removed in order to show the remainder of the plies;

FIGURE 5 is a cross-sectional view taken on line 5—5 of FIGURE 4; and

FIGURE 6 is an enlarged perspective view of one of the plies of the cord.

Referring now to the drawing and especially to FIGURE 1, it may be seen that fish netting 10 which embodies the hereindisclosed invention has a plurality of cables or cords 12 woven in a conventional fashion, and FIGURE 2 is a detailed view showing the cords knotted together.

Looking now to FIGURE 3, it may be seen that the cord which makes up the strands of the fish netting is a three-ply cord. This cord includes a first ply 14, a second ply 16 and a third ply 18. Each of the plies is identical in construction to each of the other plies so that FIGURE 6 which shows a portion of ply 14 could be considered to show also plies 16 and 18.

In this instance, the cord is 0.0880 gauge. Each of the plies of the cord is made up of three strands of 0.0080 gauge copper wire 20 and 140 filaments of 840 denier nylon 22. Nylon generally is a long-chain synthetic polymeric amide which has recurring amide groups as an integral part of the main polymer chain, and in this instance, the nylon is hexamethylene adipamide. By weight, the amounts of copper and nylon are substantially equal. In this instance, the percentage of copper wire is 51.09 percent while the percentage of nylon is 48.91 percent.

The cable or cord 12 is twisted in a conventional manner. As may be seen in FIGURE 6, the copper wire 20 and nylon filaments 22 are twisted together at 5.65 twists per inch so that the copper wire is exposed in the outer periphery of each of the plies. Looking now to FIGURE 4, it may be seen that the three plies are twisted together at 2.73 twists per inch to make up the cable or cord. Inasmuch as the plies each have copper wire exposed, the cord also has copper wire exposed intermittently. It should also be noted that though the copper wire makes up more than half of the strand by weight the exposure of the copper wire in the outer periphery of the cord is minimal.

The cord is woven into fish netting in a conventional fashion to make up netting 10. After the netting is woven, it is dipped in alcohol to dissolve partially the nylon in order to set the knots in the netting and to increase the exposure of the copper wire. The netting is then used in a well known manner for the seining of fish by commercial fishermen.

It has been found that though netting which includes cord made of cotton and copper wire has not repelled sharks, the instant netting is highly effective in repelling sharks. The reaction of ocean salt water at a temperature between 80 degrees Fahrenheit and 35 degrees Fahrenheit with the copper wire which is exposed on the outer periphery of the cord and the filaments of hexamethylene adipamide produces a product which repels fish of the group, Selachii, or shark as the group is commonly known. The product does not act as a repellant for other fish and especially fish which are taken commercially.

As was mentioned above, the netting is used in a well known manner, that is, by securing it to a fishing boat so that the fishing boat drags the netting through sea water. While the netting is in sea water a reaction of the components of the netting, namely the nylon and the copper, occurs to produce the product which repels sharks.

In addition to being a shark repellant in sea water, the instant fish netting has an excellent weight to strength ratio which makes the netting particularly desirable. By virtue of the specific combination of copper wire and nylon filaments, the cord has a high strength and an improved flexibility for the strength of the cord. Furthermore, the cord also stretches as much as 35 percent before breaking, thus giving it an improved elasticity which reduces breakage of netting due to sudden impact loads.

Although a specific construction of netting and cable has been shown and described herein, it is readily apparent that those skilled in the art may make various and sundry modifications and changes in the size of filaments, the size of wire, the number of twists and number of plies, without departing from the spirit and scope of the present invention. It is to be expressly understood that the present invention is limited only by the appended claims.

What is claimed is:

1. A fish netting comprising, in combination, a plurality of netting cords being knotted together to form netting, each of said cords being made of a plurality of plies, each of said plies being made of a plurality of filaments of nylon and a strand of copper wire, each of said plies having the strands of nylon and copper wire twisted together to expose the copper wire at intervals, whereby said netting used in salt water is a shark repellant.

2. Cord for use in the manufacture of fish netting for seining fish from the ocean and repelling sharks comprising, a plurality of plies being twisted together at least one of said plies including a copper wire and a plurality of filaments of nylon twisted with said wire to expose the wire at intervals on the outer periphery of the ply.

3. Fish netting for use in seining fish from an ocean and repelling sharks comprising, a plurality of pure copper wire strands being twisted together with a plurality of nylon filaments in the ratio of one strand of copper wire to at least 45 filaments of nylon and the ratio of nylon to copper being slightly less than one to one by weight, said copper and nlyon being twisted to expose the copper at the outer periphery of the ply formed by the nylon and copper at intervals, second and third plies being made in the identical fashion as the first-mentioned ply, the first-mentioned ply and second and third plies being twisted together, whereby the three plies twisted together in salt water provide an effective shark repellant.

4. A cord for use in the manufacture of commercial fish netting which is a shark repellant comprising, a plurality of plies being twisted together, each of said plies having a plurality of strands of pure copper wire twisted together with a plurality of filaments of hexamethylene adipamide, said hexamethylene adipamide, being in greater volume than the copper wire to cover the copper entirely except for periodic exposures of the copper at the outer periphery of the ply and said copper being approximately fifty percent of the ply by weight, whereby said copper and hexamethylene adipamide being in ocean salt water produces a shark repellant.

References Cited in the file of this patent

UNITED STATES PATENTS

| | | |
|---|---|---|
| 118,772 | Camp | Sept. 5, 1871 |
| 1,688,261 | Branner | Oct. 16, 1928 |
| 2,590,586 | Thompson et al. | Mar. 25, 1952 |
| 2,894,366 | Leckie | July 14, 1959 |

FOREIGN PATENTS

| | | |
|---|---|---|
| 742,995 | Germany | Dec. 16, 1943 |
| 25,690 | Great Britain | 1908 |

OTHER REFERENCES

The Modern Textile Dictionary, by G. E. Linton, Page 457, Published 1954 by Duell, Sloan and Pearce Little, Brown and Co., Boston.

The Condensed Chemical Dictionary. Published 1956 by Chapman & Hall, Ltd., London. Pages 794 and 795.

Modern Fishing Gear of the World, Page 114, Published 1959 by Fishing News, London, England.

Modern Fishing Gear of the World, Page 540, Published 1959 by Fishing News, London, England.